United States Patent [19]
Bendall

[11] 3,955,377
[45] May 11, 1976

[54] FLEXIBLE COUPLINGS

[76] Inventor: Wilfrid H. Bendall, 12 Castle Hill Road, Pawcatuck, Conn. 02891

[22] Filed: May 6, 1975

[21] Appl. No.: 574,925

[52] U.S. Cl. .............................. 64/11 R; 64/13; 64/15 B
[51] Int. Cl.² ............................................ F16D 3/17
[58] Field of Search ............... 64/11 R, 13, 27 NM, 64/15 B

[56] References Cited
UNITED STATES PATENTS

| | | | |
|---|---|---|---|
| 1,379,962 | 5/1921 | Chilton | 64/15 B |
| 1,379,964 | 5/1921 | Chilton | 64/15 B |
| 1,595,412 | 8/1926 | McCoy et al. | 64/13 |
| 2,693,222 | 11/1954 | Krupp | 64/11 R |
| 3,759,063 | 9/1973 | Bendall | 64/11 R |

FOREIGN PATENTS OR APPLICATIONS

| | | | |
|---|---|---|---|
| 1,034,034 | 4/1953 | France | 64/11 |

Primary Examiner—Benjamin W. Wyche
Assistant Examiner—Randall Heald

[57] ABSTRACT

A flexible coupling for transmitting power and accommodating compound misalignment between shaft hub or tubular members. The coupling comprises an extended length of a given width of thin, resilient, high strength material provided with lengthwise corrugations and coiled freely on itself with meshing corrugations to a given radial thickness to constitute a hollow, laminated flexible element having annular, axially spaced corrugations extending between integrally flanged end portions for attachment to coaxial transmission members. The element is self-sealing and can be used to transmit fluid pressure between tubular interconnected members.

10 Claims, 3 Drawing Figures

FLEXIBLE COUPLINGS

SUMMARY OF THE INVENTION

This invention relates broadly to flexible couplings for mechanical power transmission and particularly to couplings embodying all-metal flexural elements for interconnecting coaxial, relatively rigid shaft hub or tubular transmission members. Such couplings are required to meet a broad range of drive conditions including high torsional, axial and angular displacements of connected members.

The prior art discloses many flexible coupling constructions that meet one or another of these requirements in some degree, but discloses few all-metal constructions able to handle the full range of requirements. A substantially greater degree of axial flexibility than ordinarily attained is required to make such couplings universally applicable for drive uses including constant velocity automotive propeller shafts, aerospace controls requiring synchronized inter-shaft coupling through relatively large angles without lost motion or backlash, and for the increasing industrial need for an all-metal coupling with such attributes.

Meeting the foregoing requirements is a primary object of the present invention. Further important objects are to provide such a coupling of simple, compact design and low construction cost, free from maintenance requirements and having structural parts in a conveniently separable and accessible form. Still further objects are to provide a basic coupling construction in which the torsional and axial characteristics, within given dimensions, can be readily varied to suit drive requirements simply by varying the proportions of the flexural element. Further equally important objects are to provide such a coupling construction of all metal or equivalent heat resistant material capable of efficient operation over a wide temperature and speed range, and noiseless in operation.

The foregoing and other objects of the present invention will be apparent to those knowledgeable in the art following reference to the accompanying description, drawings and claims of this specification.

THE DRAWINGS

DETAILED DESCRIPTION

Figure 1:
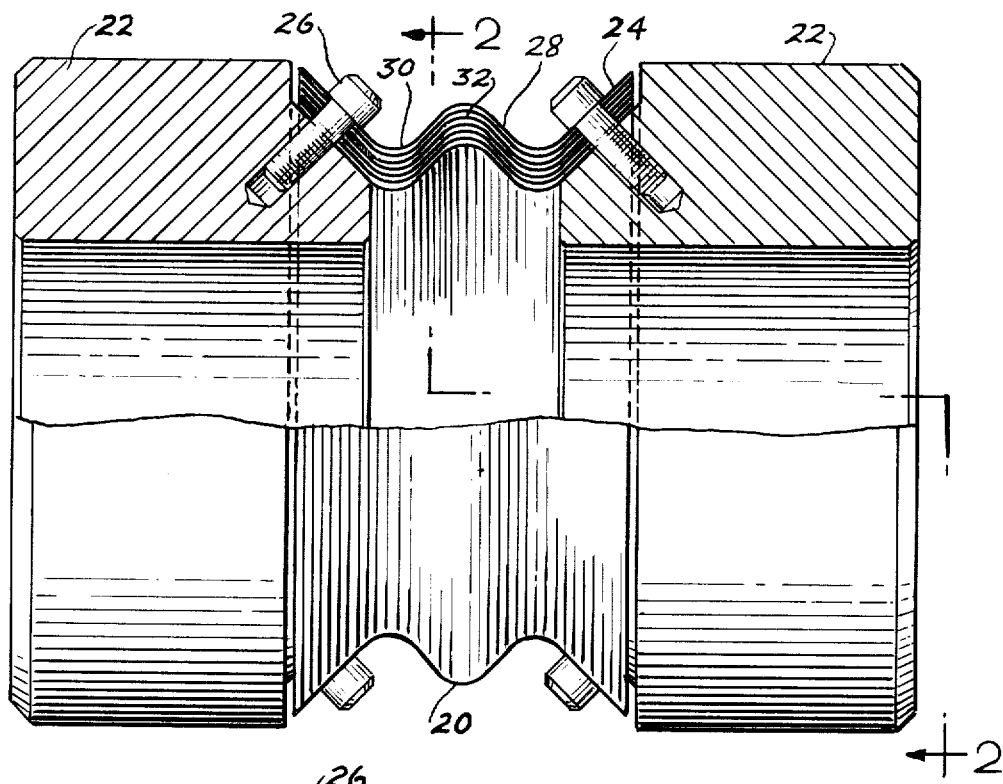
FIG. 1 is a longitudinal partly sectioned and partly diagrammatic view of a flexible coupling embodying this invention.
Figure 2:
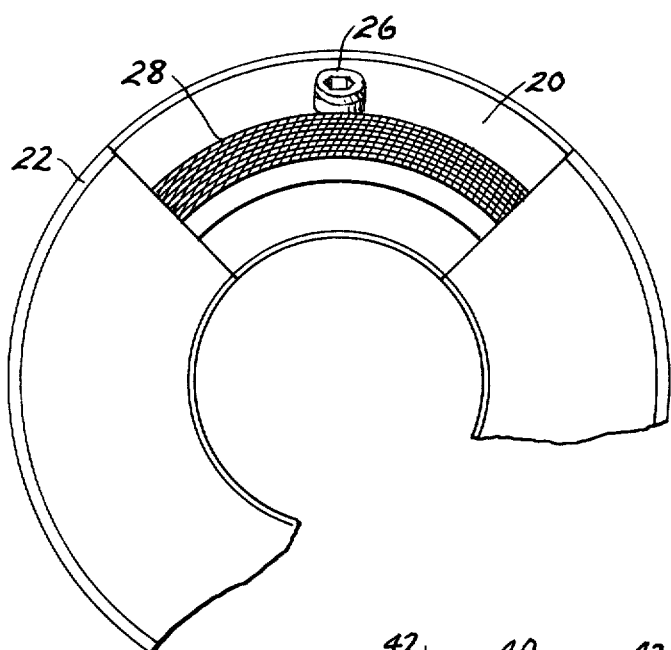
FIG. 2 is a fragmentary partly sectioned end view of the coupling on the line 2—2 of FIG. 1.

Referring to the drawings, FIGS. 1 and 2, respectively, illustrate longitudinal axial and end views of the coupling of this invention. Reference numeral 20 designates a flexible element connected to duplicate shaft hub members 22. Element 20 comprises an extended length of relatively thin, resilient, high strength material of given width, formed with continuous, transversely spaced longitudinal corrugations and coiled freely on itself with meshing corrugations to a given superimposed thickness and coil diameter. Assembled thus it constitutes an axially hollow, annularly corrugated flexible coupling element of relatively high torsional capacity.

It is to be understood that for simplicity and clarity in drawing, since the material constituting the coil is required to be relatively thin, the cross-sections of the individual layers of the coil are diagrammatically indicated by single lines. Extended edge portions 24 of the coil are provided with registering apertures for fastening means 26 which secure it to the hub members. As shown, the corrugations are formed with alternating flat portions 28 and curved portions 30. As coiled in superposition with meshing corrugations the flat portions are in supporting bearing contact with each other while the curved portions, tangent thereto, clear each other. The clearances 32 at the meshed curved portions may conveniently be utilized to retain a dry or semi-fluid lubricating medium, to inhibit interlaminary fretting. The flat strip material, such as spring steel, required for the flexible element of this coupling can readily be corrugated in continuous lengths on commercial roll-forming equipment. The material is specified to provide sufficient ductility to accommodate a moderate amount of stretch at the extended edge portions when subsequently preformed to a required minimum coil diameter. The corrugated material preferably is preformed to a coil diameter slightly less than the required minimum diameter so that it is, in effect, conveniently self-coiling and self-retaining in the coil form.

A provision for coupling disconnection without disturbing the spacing or alignment of connected units is an important industrial coupling requirement. The flexible coupling of the present invention permits this in two ways — either by removing the fastenings 26 in FIGS. 1 and 2 and simply uncoiling the corrugated material, or by utilizing the modification diagrammatically illustrated in FIG. 3. In the latter figure the edges 42 of a typical coiled element 40 are secured to annular members 44 having attachment surfaces in a plane normal to the axis of the coupling which secure, in turn, to flanged hub members 46 by screws 48. Removing the screws enables removal and replacement of a flexible element in a plane normal to the axis of a coupling without disturbing connected members. It is to be understood that the coiled element 40 is separately secured to annular members 44 with fastenings inserted in registering apertures in the coil as described for the arrangement shown in FIG. 1. Alternatively such fastenings may extend through both the coil and members 44 to engage hub members.

Figure 3:
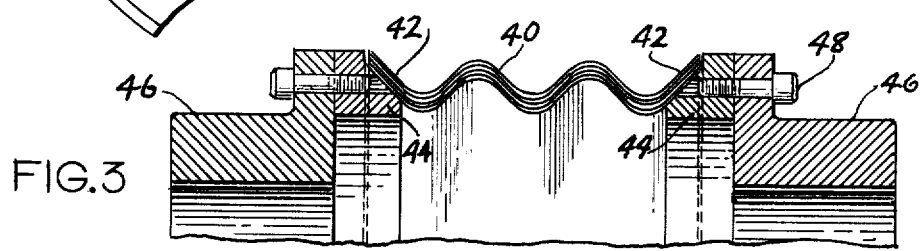
FIG. 3 is a longitudinal diagrammatic view of a modification permitting removal of the flexible element without moving connected transmission units.

While not specifically detailed for the purpose, the flexible coupling of this invention has been briefly referred to in the foregoing summary as adapted for interconnection of tubular transmission members and thus implicitly adapted for the transmission of fluid pressures. This will be understood when it is observed that the flexible element, as shown in FIGS. 1-3, constitutes an integral, completely enclosed and substantially self-sealed annular coupling structure if suitably gasketed at the internal flanged end surfaces of the coil and thus well adapted for this purpose.

It is to be understood that the foregoing description and accompanying drawings describe and illustrate preferred embodiments of the flexible coupling of this invention and further, that this invention lends itself to a number of modifications which will be apparent to those skilled in the art, such as variations in the flexible element material thickness, corrugation form and spacing and attachment to connected units, and in its adaptability to inclusion of interlaminary visco-elastic or other torsional vibration damping means, all of which modifications are held to come within the scope of the following claims;

What is claimed is:

1. A flexible coupling operatively connected to coaxial shaft hub or tubular members for the transmission of power, said coupling comprising an extended length of thin, resilient material of a constant given width formed with a plurality of continuous, transversely spaced uniform corrugations and coiled freely on itself with meshing corrugations to a given radial thickness, the corrugations thereof being in superimposed annular contact with each other at axially spaced lines, said coiled material being operatively connected to the hub members by fastening means extending through the coil and engaging said members, said coiled material comprising an integral, axially hollow, annularly corrugated flexible coupling means for the transmission of varying torsional, axial, angular and internal pressures between said members.

2. A flexible coupling as defined in claim 1, said coupling having a plurality of uniformly shaped and axially spaced annular corrugations.

3. A flexible coupling as defined in claim 2 further comprising a plurality of substantially concentric corrugated coils of said material.

4. A flexible coupling as defined in claim 1 wherein said corrugations are in supporting contact with each other at said axially spaced lines and are out of contact with each other between said lines.

5. A flexible coupling as defined in claim 1 wherein said coupling means has flanged edge portions for securing it to coaxial members.

6. A flexible coupling as defined in claim 5 wherein said flanged edge portions have registering apertures for fastening means securing the edge portions to coaxial members.

7. A flexible coupling as defined in claim 6 wherein said flanged edge portions include attachment surfaces in planes normal to the axis of said coupling.

8. A flexible coupling as defined in claim 1 wherein adjacent internal surfaces of the coiled material define annular recesses for retention of an adherent lubricating and vibration damping medium.

9. A flexible coupling as defined in claim 1 wherein said corrugated material is preformed to a given mean radius of curvature.

10. A flexible coupling as defined in claim 9 wherein said corrugated material is elastically removable and replaceable by uncoiling and re-coiling it without requiring displacement of connected members.

* * * * *